April 3, 1934.                W. L. THAETE ET AL                 1,953,448
                                  FAUCET
                             Filed July 21, 1933

Inventors
Emelia J. Thaete,
William L. Thaete.
By A. J. O'Brien
Attorney

Patented Apr. 3, 1934

1,953,448

UNITED STATES PATENT OFFICE 1,953,448

FAUCET

William L. Thaete and Emelia J. Thaete, Denver, Colo.

Application July 21, 1933, Serial No. 681,624

1 Claim. (Cl. 251—46)

This invention relates to improvements in faucets and has reference more particularly to an improved sealing device that can be substituted for the usual fiber or leather washer now extensively employed.

It has been found from experience that the ordinary faucets employing the usual type of sealing washer does not maintain a perfect seal for any length of time due primarily to the fact that the sealing washer is affected by the water to such an extent that it softens and begins to disintegrate, thereby making it impossible to obtain and maintain a perfect seal.

It is the object of this invention to produce a sealing device that shall be made of a material that will not be affected by the action of the water, such, for example, as stainless steel, and which shall be so designed that it can be applied to the ordinary faucet without making it necessary to change the valve seat or any of the other parts of the faucet.

Another object of this invention is to produce a sealing device that shall be so constructed and so applied or attached to the valve stem that it can rock with respect to the latter, thereby permitting the sealing surface to conform to the valve seat so as to produce a perfect seal between the two metal surfaces, even though the surface of the valve seat does not lie in a plane perpendicular to the axis of the valve stem.

Another object of this invention is to produce a sealing device that shall be so constructed that it can be movably attached to the end of a valve stem by means of a screw and which shall be provided with means for closing the opening so as to prevent leakage between the member and the screw.

Another object of the invention is to produce a sealing device that shall be so constructed that after the valve has been opened, the flow of water will be controlled by means of a tapered plug projecting into the valve opening and in this manner a better control of the flow obtained.

The above and other objects that may become apparent as this description proceeds are attained by means of a construction and an arrangement of parts that will now be described in detail, and for this purpose reference will be had to the accompanying drawing in which the preferred embodiment of the invention has been illustrated, and in which.

Figure 1:
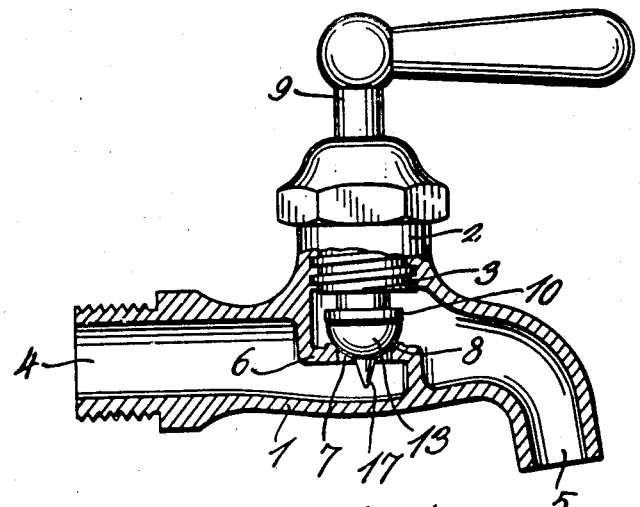
Fig. 1 is a section through a faucet provided with our improved sealing means.
Figure 2:
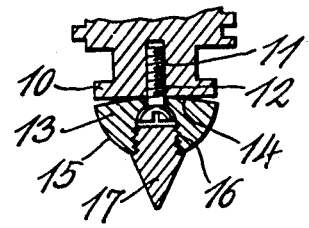
Fig. 2 is a section through the lower end of the valve stem and the sealing device and shows the manner of attaching the latter to the valve stem.

In the drawing reference numeral 1 represents the valve housing which is the usual type of housing for ordinary faucets. This housing is provided with a bonnet 2 that has a threaded opening 3 and has an intake opening 4 in one end and an outlet opening 5 in the other end. The intake and outlet openings are separated by a partition 6 that has an opening 7 that is axially aligned with the opening in the bonnet. The upper edge of the wall surrounding the opening 7 forms the valve seat 8. Mounted for rotation in opening 3 is a valve stem 9 whose lower end is provided with an enlarged head 10 whose lower surface lies in a plane perpendicular to the axis of the valve stem. A threaded opening 11 extends into the valve stem and is adapted to receive a screw 12 by means of which the sealing device 13 is secured to the valve stem. This sealing device is preferably made from stainless steel but can be made from any other metal that is not affected by the action of the water or other fluid for the control of which the faucet is employed. The sealing device is of a peculiar construction and the surface that is in contact with the lower end of the valve stem is convex and has been designated by reference numeral 14. Surface 14 may be spherical or conical, as the convexity is intended merely to permit the sealing device to rock on the end of the valve stem. The lower surface of the sealing device, which has been indicated by reference numeral 15 is preferably spherical, but any other suitable convex surface may be employed. An opening 16 extends through the sealing device and the lower end of this opening is enlarged so as to receive the head of a screw by means of which the device is secured to the valve stem. The enlarged opening has threaded sides for the reception of a plug 17 that serves to close the opening against the admission of water and to prevent leaks about the screw. The plug 17 is preferably tapered and may be somewhat larger in diameter than indicated on the drawing and it will therefore tend to restrict the flow of water to the opening 7 after the valve has been opened so as to more perfectly control the flow. The spherical surface 15 is adapted to fit the round opening 7 and to form a seal at this point. Since the opening 7 is not always perfectly aligned with the opening in the bonnet, it is necessary that the sealing device shall be permitted to move relative to the valve stem so that it may adapt itself to the valve seat, and for this purpose the surface of the sealing device in contact with the valve stem is made convex and the securing means comprising the screw holds the sealing device movably connected with the valve stem. The spherical surface 13 has been shown as having a large degree of curvature or in other words, a short radius of curvature, but the exact curvature is immaterial and should be selected so as to get the best results. The particular shape of sealing device shown and described is adapted for sealing devices made from stainless steel or other hard metal and it is obvious that it would have little advantage if the sealing devices were made of rubber, leather or fiber or any other similar material that yields under pressure, and the particular shape is therefore believed to be of great importance in connection with metal sealing devices that depend for their sealing action on making a perfect fit instead of conforming to irregularities by yielding.

Figure 3:
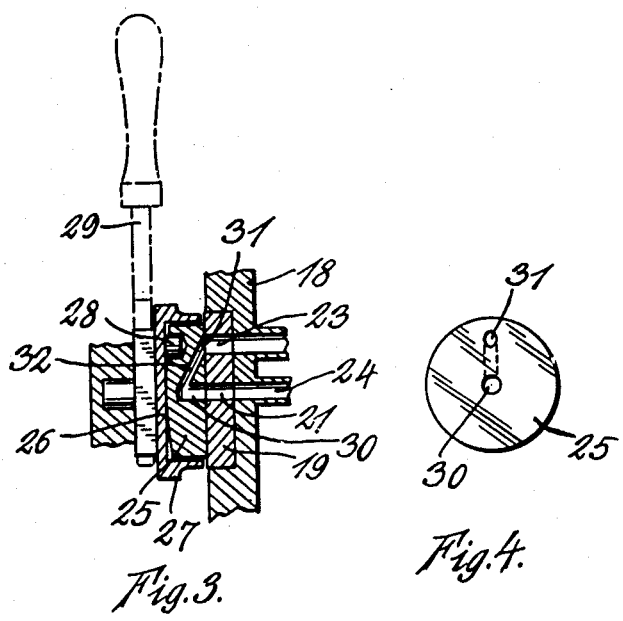
Fig. 3 is a section through a different form of valve showing the same provided with a sealing device constructed in accordance with this invention.
Figure 4:
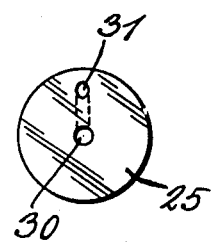
Fig. 4 is a plan view of the sealing surface of the sealing device shown in Fig. 3.
Figure 5:
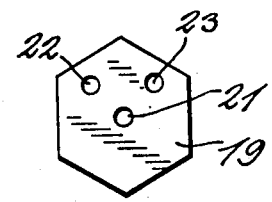
Fig. 5 is a view showing the sealing surface of the valve member that cooperates with the sealing device shown in Fig. 4.

In soda fountains and other places, a slightly different form of valve is used and in Fig. 3 one of this type of valves has been shown in a more or less diagrammatic manner. Numeral 18 represents a metal body having a recess for the reception of a treated leather valve member 19. This member is preferably made in the shape of a polygon as shown in Fig. 5 and is provided with three openings which have been numbered 21, 22 and 23. Member 18 is provided with three openings that correspond in position with the openings in member 19 and opening 21 is in communication with a pipe 24 that forms the discharge portion of the valve. Openings 22 and 23 are connected respectively with water under pressure and liquid carbonic acid gas or with any other two fluids under pressure. Cooperating with the member 19 is a sealing device 25 that is preferably made of stainless steel and has its back surface 26 convex. The other surface is preferably flat and cooperates with the surface of member 19. The sealing device 25 is located in a valve cup 27 that corresponds to the valve stem in Fig. 1. This cup is provided with a pin 28 that cooperates with an opening in member 25 for the purpose of preventing relative rotation between these two parts. A handle 29 is connected with the member 27 and serves as a means for rotating the same. The sealing device 25 is provided with a central opening 30 and with another opening 31 that is spaced radially from opening 30 a distance equal to the distances from the center of opening 21 to the center of openings 22 and 23. Openings 30 and 31 are connected by a diagonal opening 32. When the two members 25 and 19 are held in assembled relation as shown in Fig. 3, it is evident that opening 30 will always be in alignment with opening 21 and when member 25 is rotated so as to bring opening 31 into communication with either of the openings 22 or 23, liquid can flow through the valve, but if opening 23 is in any other position, the valve will be closed. It is therefore evident that a valve like that shown in Fig. 3 can be used for controlling the flow from several different sources, and discharging all of the different sources through a single pipe. The construction of valve just described is old, but the valve device 25 has heretofore been made from hard rubber and has not had a convex surface and such sealing devices have been found to wear unevenly with the result that leakage soon develops. By substituting for the rubber sealing device a steel sealing device having a convex back, the wear will not be so great and if either of the members 25 or 19 wear unevenly, member 25 can rock in the cup 27 so as to maintain even contact pressure at all points and the valve will therefore remain tight where otherwise the wear would be sufficient to cause leakage.

From the above description it will be seen that the sealing device that forms the subject of this invention has a convex back surface that is adapted to fit against a flat supporting surface and to be secured thereto by means that permits the device to rock and in this manner a perfect seal can be obtained between surfaces that would otherwise not come into sufficient close contact to form a good seal.

Having described the invention what we claim as new is:

In a valve having a valve seat and a valve stem with a flat end which is movable towards and away from the valve seat, a sealing device comprising a substantially circular metal member having its two opposite sides convex and of different curvature, the member having a central opening for the reception of a screw for securing it to the flat end of the valve stem, the opening being formed from two sections of different diameters, the section of the greater diameter being on the side of greater curvature and adapted to receive the head of the screw, the wall of the larger opening being threaded, and a plug threaded in the opening, the outer end of the plug being conical and adapted to form a retarding device, the side of lesser curvature being located against the flat end of the valve stem.

WILLIAM L. THAETE.
EMELIA J. THAETE.